C. Crompton.
Loom.
Sheet 1
No. 639.
Reissued Dec. 28, 1858.
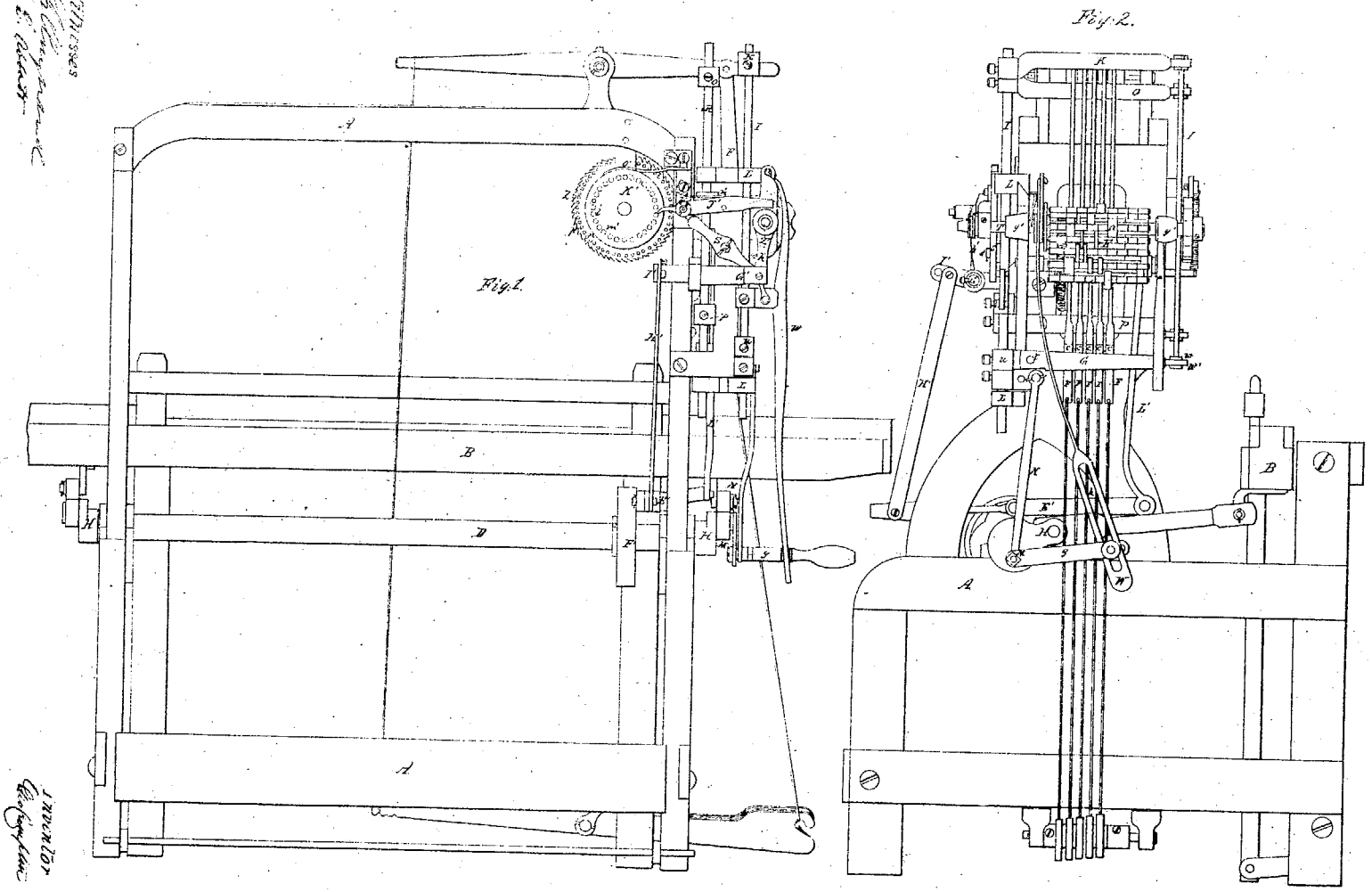
Witnesses
H. Clay Pierce
J. E. Ricketts
Inventor
Chas Crompton G. Crompton.
Loom.
No. 639.
Reissued Dec. 28, 1858.
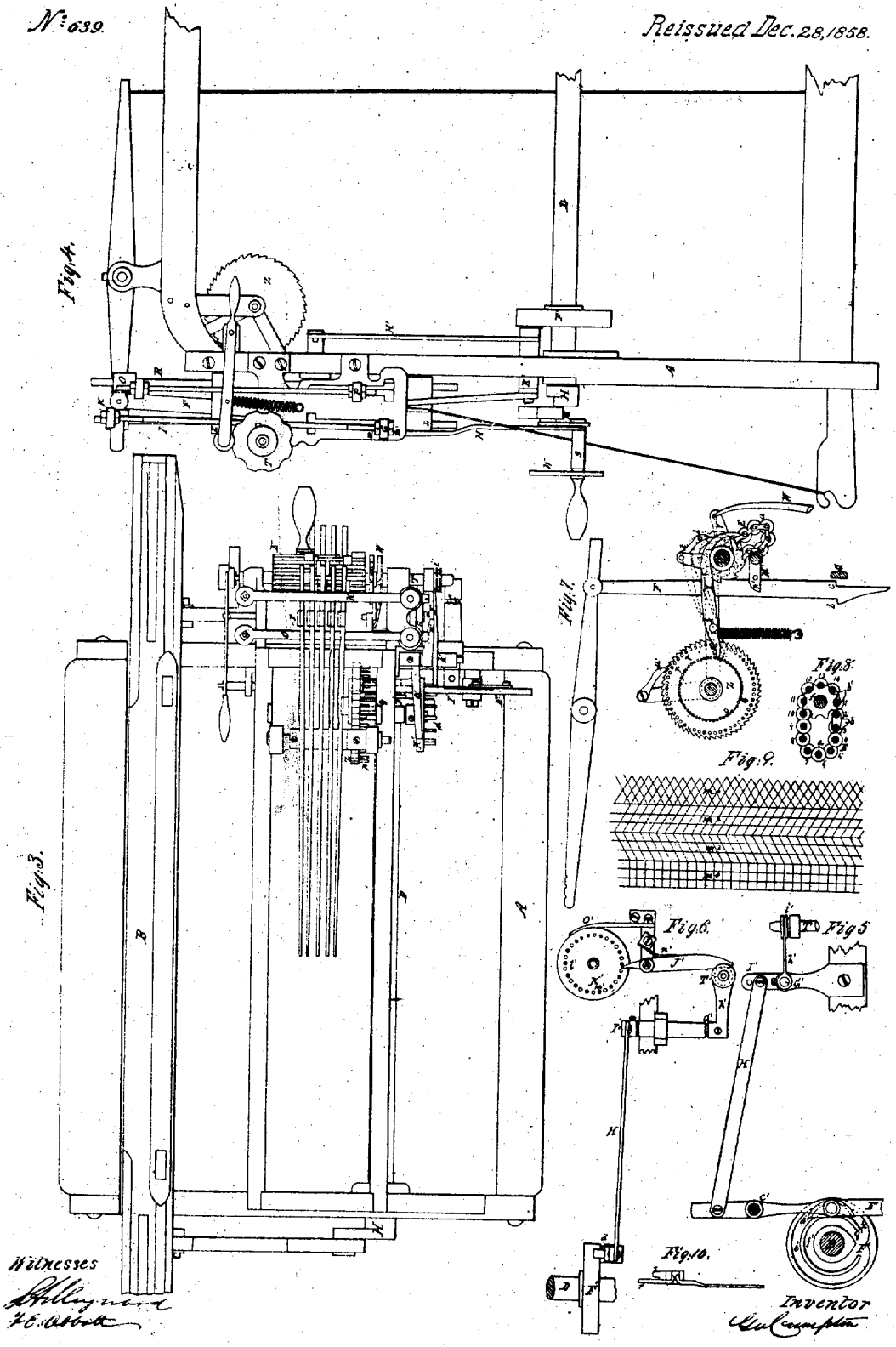
Witnesses
[illegible]
F. E. Abbott
Inventor
G. Crompton

UNITED STATES PATENT OFFICE.

GEORGE CROMPTON, OF WORCESTER, MASSACHUSETTS.

IMPROVEMENT IN LOOMS FOR WEAVING FIGURED FABRICS.

Specification forming part of Letters Patent No. 11,933, dated November 14, 1854; Reissue No. 639, dated December 28, 1858.

*To all whom it may concern:*

Be it known that I, GEORGE CROMPTON, of Worcester, in the county of Worcester, in the State of Massachusetts, have invented certain new and useful Improvements in Looms for Weaving Ornamental Figured Fabrics; and I do hereby declare the following to be a full, clear, and exact description of the same, reference being had to the annexed drawings, making part of this specification, in which—

Figure 1 is a side view of a loom with my improvements attached, a portion of the frame-work being removed; Fig. 2, an end view of the same; Fig. 3, a plan; Fig. 4, a view of the opposite side of the loom, a portion of the frame-work being removed; Figs. 5, 6, 7, 8, 9, and 10 are details, which will be referred to hereinafter.

In weaving ornamental figured goods, both colored and plain, it is often desirable to repeat one pattern for a certain distance, and then to follow it by another, which in like manner is repeated as far as required, and so on with four or more separate patterns, the complete series when finished being again repeated in the same order. To weave such goods it has heretofore been necessary to employ two or more pattern-chains, which are operated in succession, each one being run a sufficient length of time to complete the desired length of pattern before it is followed by the next one. By the use of my present invention I am enabled to weave all such goods with a single pattern-chain, in which the necessary changes required by the different figures are all automatically made by the loom itself.

To enable others skilled in the art to make and use my invention, I will proceed to describe the manner which I have adopted of carrying it out, referring, generally, to the principal features of the loom wherein they do not differ from those of similar looms as heretofore constructed, and describing particularly only those parts which form the subject of my invention.

A is the frame-work of the loom; B, the lathe, which is operated in the usual manner by cranks H upon the crank-shaft D, to which the power is applied which sets the loom in motion.

E is the pattern-chain, the rollers *a* upon which govern the motions of the harness in the customary manner. The rods F or hook-jacks are raised for the purpose of operating the heddles by the following means:

G is a bar attached to the vertical sliding rods I, which are secured at top to the bar or evener K, and slide vertically in bearings L. The frame G I K is vibrated up and down by the arm N and crank M upon the shaft D. A similar frame, composed of the horizontal bars O P and vertical rods R, serves the purpose of depressing those rods or hook-jacks which require to be carried down, the bar P taking into the hooks *b* upon the rear of the rods or jacks F, and the bars G in the hooks *c* upon the front of the same rods. These two frames are so connected with each other by the lever S, pivoted at *d*, that as one of them rises the other falls in a manner similar to that employed upon other looms of this kind.

In order that the shed may be evenly and uniformly opened, I have adopted the following plan of giving an increased motion to those leaves of the harness which are farthest from the shuttle-race. The bars G, instead of being connected rigidly with rods I, are pivoted at *t* to an adjustable socket, *u*. The other end is raised or lowered by the nuts *w w'*, by which means the bar may be set at any desired inclination. One end of the bar P, which depresses the rods or jacks F, is made similarly adjustable, and thus the shed is evenly and uniformly opened, which would not be the case were the lifting-bar G to be horizontal.

I will now describe the manner in which the pattern-chain is operated. It is carried in the usual manner by notched wheels *f* upon the shaft T, which are caused to revolve by the following means:

U, Fig. 7, is a ratchet-wheel upon the shaft T, having a number of teeth equal to the number of notches in the carrying-wheels *f*.

V is a bent lever, which is allowed to move freely upon the shaft T and is vibrated by the rod W, which is set in motion by a pin in the crank *g*, which plays in the slot *h*. The lever V carries a pawl, *i*, which engages with the teeth of the ratchet-wheel U, and thus, as the crank *g* revolves, the shaft T, and with it the pattern-chain, is set in motion.

X is a lever pivoted at *k*, of the form represented in Fig. 7, which projects over the shaft T and lies immediately at the side of the ratchet-wheel U.

*l* is a pin projecting from the side of the pawl *i*, which rests upon the top of the lever X. The object of this lever, which may be placed in three different positions, is to regulate the distance which the ratchet-wheel is to be vibrated by the pawl when in its lowest position, as seen in Fig. 7. The pin *l* does not touch it as the pawl *i* vibrates, and the latter is allowed to turn the ratchet-wheel U a distance equal to the length of three teeth. When the lever is raised into its second position, as seen in red lines in Fig. 7, the pin *l* is raised from out of contact with the ratchet-wheel for a portion of its vibration, and the latter is moved two teeth; and when the lever X is raised into its third position, as seen in blue in Fig. 7, the pawl is thereby raised so high that it is made to pass over two teeth of the ratchet wheel, which, in consequence, is only moved a distance equal to the length of but one tooth. As the number of teeth in the ratchet-wheel is the same as the number of the notches in the wheels which carry the pattern-chain, it is evident that when the ratchet-wheel is moved but one tooth the rollers upon each successive rod of the chain are brought around to act against the rods or jacks F. When, however, the ratchet-wheel is moved two teeth, the rollers upon every alternate rod are brought into operation, and when the ratchet-wheel is moved three teeth the pattern-chain is moved a corresponding distance, only every third rod of rollers being brought into operation.

The object of communicating these different degrees of motion to the pattern chain will now be explained. Suppose A′ A′, Fig. 9, to be the pattern which is first to be woven for a specified length of cloth, and that the pattern for weaving one of the diamonds, *m*, be arranged upon the rods 1 3 5 7 9 11 13 of the chain. Let the chain be in such a position that the rollers upon the rod 1 bear upon the rods F, and let the lever X be in such a position that the pawl *i* shall move the ratchet-wheel two teeth each time the crank-shaft revolves. It is evident now that the pattern upon the rods 1 3 5 &c., will be repeated so long as the lever X remains unmoved. Suppose, now, that after a certain interval it be required to follow this pattern by another, B′, Fig. 9. The pattern for weaving one of the diamonds, $m^2$, is arranged upon the rods 2 4 6 8 10 12 14. The lever X is then thrown into the position as seen in black lines in Fig. 7, the pawl *i* being thereby permitted to turn the ratchet-wheel three teeth, and the pattern-chain is moved from 13 to 2, or so that the rollers upon the latter rod bear upon the rods F. The lever X is immediately returned to the position which permits the ratchet-wheel to be revolved two teeth at a time, and the patterns upon the rods 2 4 6 8 10 12 14 are repeated so long as the lever X continues unmoved. If now it be desired to repeat the pattern A′ after a sufficient quantity of the pattern B′ is woven, it is evident that, as the former must begin with the rod 1 while the latter ends with the rod 14, in order to make this transition from 14 to 1 the ratchet-wheel must be revolved one tooth only. To accomplish this the lever X is raised to its highest position, (as seen in blue lines in Fig. 7,) and before the next pick the lever is again returned to its intermediate position, and the pattern upon the rods 1 3 5 7, &c., continues until the lever X is again changed.

It now remains to show the manner in which the lever X is thrown into the desired positions at the proper time to govern the motions of the pattern chains. This is accomplished by the pattern-wheel Z having two circles of holes, *n o*, into which are inserted pins *p q*, the latter being double the length of the former, Fig. 3.

The wheel Z is revolved in the following manner: *a* is a pawl, which engages with teeth upon the periphery of the wheel Z, and is operated by dogs *b′* upon the pattern-chain. Whenever it is required that the pawl *i* shall move the ratchet-wheel U two teeth for the purpose of bringing every alternate rod of the chain into operation, one of the pins *q* is allowed to strike upon the toe *r* of the lever X and throw the latter into the position represented by red lines. When it is required to move the ratchet-wheel U but one tooth, one of the outer circle of pins, *p*, is allowed to bear upon the lever X at *s*, Fig. 10, by which means the latter is raised into the position represented by blue lines, Fig. 7, and the pawl *i* is held up so that the ratchet-wheel U is moved but one tooth. If it be required to pass over two rods of the chain, and to bring the third one into operation, the lever X is allowed to drop upon the shaft T, which is accomplished by leaving the holes *n o* in the wheel Z vacant, which permits the lever X to take the position shown by black lines, Fig. 7, so as not to interfere with the operation of the pawl *i*. The pins *p* and *q* are so arranged in the holes of the wheels Z as to give the proper succession of figures by governing the motions of the pattern-chain, as required.

The second part of my invention consists in placing two patterns side by side upon the rods of the pattern-chain, the latter being vibrated longitudinally at proper intervals, so as to bring one or other of these patterns into operation at a time, the lateral vibration of the pattern-chain being governed by a pin-wheel similar to the one described above, for the purpose of regulating the revolving motion of the pattern-chain. By a reference to Fig. 2 it will be seen that there are two separate patterns arranged upon the chain, a portion of the rollers being of sufficient width only to allow them to enter between the rods F. These patterns are so arranged that when the chain is in one position one only of the patterns is brought into operation, and when it is vibrated slightly to one side this pattern is thrown out of operation and the other is brought into use.

The vibration of the pattern-chain at the proper time is effected in the following manner: E′ is a lever pivoted to the frame of the loom at $c'$, and which is vibrated once for every revolution of the crank shaft in the following manner: $d'$ is a shoe attached to this lever by a pin. This shoe runs in a double groove, $e'$ $f'$, Fig. 5, of the wheel F′, upon the crank-shaft D. This groove is so formed that on the arrival of the shoe at the point $x'$ it is switched into the groove of smaller diameter, $f'$, and again at the arrival of the shoe at the point $y'$ it is switched into the groove of larger diameter, $e'$. A vibratory motion is thus communicated to the lever E′ up and down once for every two revolutions of the crank-shaft.

The shaft T, which carries the pattern-chain, is vibrated in its bearings $g'$ in the following manner: $h'$ is a spring fork, which is made to play in one of two grooves, $i'$, on the shaft T. This spring is attached to the short shaft G′. I is an arm projecting from the shaft G′, and connected with the lever E′ by the rod H′. By these connections it will appear that when the lever E′ is vibrated by the revolutions of the cam F′, the shaft G′ will also be vibrated, and a longitudinal vibratory motion will be communicated to the shaft T of the pattern-chain, except when this shaft is held stationary, by means to be presently described, in which case the spring-fork $h'$ is allowed to bend as the shaft G′ vibrates, and no motion is communicated to the shaft T. This latter is held stationary, when it is not required to move, in the following manner: J′ is a lever pivoted at $k'$, one end of which is allowed to rest in one or other of the grooves $i'$. K′ is a wheel having a circle of holes, $l'$, near its periphery. Into these holes are inserted, at suitable intervals, pins $m'$, which strike upon the rear end of the lever 1′ and raise it from out the grooves $i'$ of the shaft T. $n'$ is a spring, which presses the lever into the groove $i'$ whenever it is not raised by the pins in the wheel K. O′ is a spring which presses upon the periphery of the wheel K′ and prevents it, as well as the wheel Z, from moving, except as they are driven by the dogs $b'$ and the pawl $a'$, in the manner described.

It has been stated that some of the rollers of the pattern-chain project between the rods F, and it becomes necessary before the pattern-chain can be moved laterally that these rods should be pressed back out of its way. This is effected in the following manner: The lever E′, which effects the lateral movement of the pattern-chain, is allowed to extend upon the opposite side of its pivot, and is connected, by the rod L′, to the vibrating frame M′, Fig. 7, having fingers $p'$, which project between the rods F′. A horizontal rod, $q'$, passes through these fingers, and as the frame M′ is vibrated in the manner before described these rods are pressed back out of the way of the rollers upon the pattern-chain, which latter is thus left free to be moved laterally, if required; and as by this means the rods or jacks are vibrated out of contact with the rollers of the pattern-chain, before these are shifted it follows that all wearing of the surface of the rollers is avoided. Let us suppose now that the requisite amount has been woven of the patterns A′ B′ and that it be desired to follow them by the patterns C′ D′, Fig. 9. The pattern C′ is arranged upon the rods 2 4 6 8 10 12 14 by the side of the pattern B, and upon completion of the latter pattern a pin, $m'$, in the wheel K′ raises the lever J′ from out the grooves $i'$, and the rods F, having been pressed back by the rod $q'$, as described, the shaft T is vibrated by the spring $h'$, and the next instant the lever I′ falls into the next groove, $i'$, and the shaft of the chain is again prevented from being vibrated laterally until a sufficient quantity of the pattern C′ has been woven. The pattern D′ is arranged upon the rods, 1 3 5 7 9 11 13 by the side of the pattern A′, and the pattern C′ being completed the chain is shifted so as to bring the rods 1 3 5, &c., into operation in the manner already described, which entire revolution of the pattern-chain, as before, is sufficient to complete one of the squares $m^4$. On the completion of the requisite amount of this pattern the pattern-chain is moved laterally in the manner before described, and the series is again repeated, beginning at A′, as before.

It is evident that the number of patterns which may be arranged upon a single chain by either of the above methods is not limited to two or four, but that a greater number may be employed, the size and proportions of the parts immediately connected therewith being varied in accordance.

What I claim as my invention, and desire to secure by Letters Patent, is—

1. Combining with hook-jacks, which are connected with the harness and with the mechanism for operating them to open the shed, substantially as described, a pattern chain or cylinder constructed with two or more patterns, and operated so that either of the patterns can be made to act on the hook-jacks to place them in the required position to be operated upon by the mechanism for opening the shed, substantially as described.

2. In combination with a pattern-chain arranged with two or more patterns in the direction of its length, the mechanism, substantially such as herein described, for changing the movements of the chain to effect the changing of the pattern, as described.

3. Placing two or more patterns upon the rods of a pattern-chain side by side, and operating them in succession by vibrating the chain laterally, in the manner substantially as described.

4. Pivoting the lifting and depressing rods G P at one end, the other being made adjustable, in the manner and for the purpose set forth.

5. Moving the rods or jacks out of contact with the rollers on the pattern-chain before the chain is moved by means of what are termed the "vibrating fingers," or the equivalents thereof, substantially as described.

GEO. CROMPTON.

Witnesses:

L. A. MAYNARD,

J. E. ABBOTT.